United States Patent Office 3,309,354
Patented Mar. 14, 1967

3,309,354
METALLIZED MONOAZO COMPLEXES
Ugo Moiso, Cesano Maderno, Milan, and Sisto Sergio
Papa, Milan, Italy, assignors to Aziende Colori Nazionali Affini-Acna S.p.A., Milan, Italy
No Drawing. Filed May 27, 1963, Ser. No. 283,597
Claims priority, application Italy, May 30, 1962,
10,700/62
2 Claims. (Cl. 260—145)

The present invention relates to new mixed metallized complexes. More particularly the present invention relates to new dyeing compositions, especially suitable for dyeing natural or synthetic polyamide fibers, obtained by cobaltizing a specified mixture of monoazo dyes. The present invention relates moreover to a process for obtaining said compositions.

Blue dyes are known to be obtained by metallization in aqueous phase or anhydrous phase, respectively, of monoazo dyes of the type:

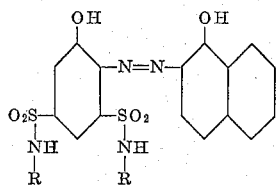

wherein R=low molecular weight alkyl.

Such dyes are valuable for dyeing in neutral bath synthetic or natural polyamide fibers. As disclosed in Italian Patent No. 594,258, the diazo-components which are obtained from disulfamide bases of the formula

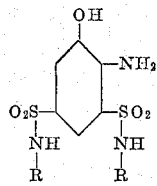

display the interesting characteristic of affording a monoazoic coupled in 2-position on 1-naphthol. However, at least for some percent units there also occurs the monoazo coupled in the 4-position. Therefore at this moment a purification has to be made on the monoazo in order to remove the 4-isomer. This latter material does not afford stable metallic complexes upon the subsequent metallization, and additionally causes colored acetate reserve, while occasionally impairing the dye utilizability.

The monoazo wholly coupled in 2-position on the 1-naphthol nucleus may, on the other hand, be obtained when a derivative of 1-naphthol having the 4-position already occupied is employed. Thus, with substituents in the 4-position such as —Cl, —CH$_3$, OC$_2$H$_5$ there have been obtained monoazo materials wholly coupled in the 2-position, which however—after cobaltizing—have given rise to dyes not quite satisfactory as regards shade, purity and/or fastness. Better results (even if not excellent) are attained with the substituent —OCH$_3$ in the 4-position, namely with monoazo materials of the general formula

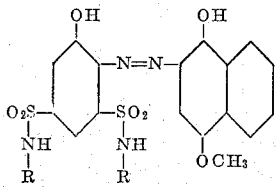

R=low molecular weight alkyl.

Thus, the cobalt complex (Co:monoazo molar ratio= 1:2) (IV) of the monoazo

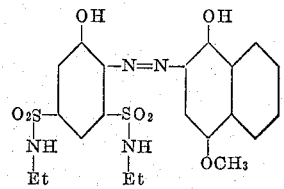

which in turn is obtained by coupling in alkaline medium the diazo of 3,5-bis-N-ethyl-sulfamido-2-aminophenol (I) on 4-methoxy-1-naphthol (II), is a dye of dark blue shade, of excellent purity and solubility, which dyes wool and synthetic polyamide fibers in neutral bath. However, the exhaustion and rayon reserve characteristics are moderate. Light and wet fastnesses are good, but the sweat and potting characteristics are poor.

On the other hand, the cobalt complex (Co:monoazo molar ratio=1:2) (VII) of the monoazo:

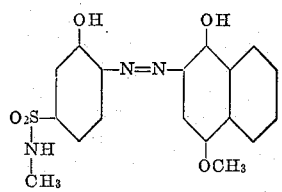

(obtained for instance by coupling in alkaline medium the diazo of 5-N-methyl-sulfamido-2-aminophenol (V) on 4-methoxy-1-naphthol (II)) is only a slightly interesting dye owing to the blue shade, very reddish and turbid on wool and synthetic polyamide fibers; it dyes in neutral bath with excellent exhaustion. Fastnesses however are deficient as regards light fastness.

We have now surprisingly found that, in contrast to what might be expected, by metallizing with a Co compound admixtures of monoazo materials (III) and (VI) in a molar ratio of between 20–50% of the first and 80–50% of the latter, respectively, (preferably with a molar ratio of 25% and 75%, respectively) new mixed complexes are obtained, endowed with outstanding characteristics of purity, affinity in neutral bath for natural or synthetic polyamide fibers, and reserve effects (acetate rayon and cotton). Wet fastnesses, including those to sweat and potting, as well as to light, are likewise good and more than satisfactory.

It is therefore an object of the present invention to provide mixed complexes, constituted of a mixture containing from 20 to 50 mole percent (preferably 25 mole percent) of the monoazo of the formula

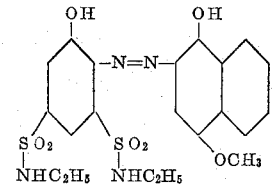

and from 80 to 50 mole percent (preferably 75 mole percent) of the monoazo of formula:

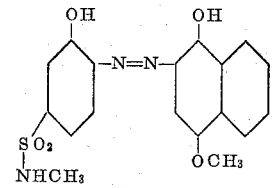

cobaltized, the molar ratio metal:mixture of monoazos being 1:2.

A further object of this invention is a process for preparing said complexes.

Metallization is carried out preferably in anhydrous phase, while reacting the mixture of monoazos, previously dried, and the metallizing agent, in a mixture of organic compounds, such as urea-ethylene glycol (or ethers of said glycol); urea-formamide; urea-dimethylformamide. As the metallizing agents, cobalt salts (acetate, sulfate, chloride, etc.) are employed, in molar ratio 1:2 with respect to the monoazo mixture.

The temperature is kept between 100° and 140° C., preferably at from about 115°–120° C. The time for metallization is preferably from about 30 to 120 minutes. At the end of the metallization, the melted mass is discharged in water or diluted with water, occasionally under addition of caustic alkalies, and the dye is subsequently separated and dried according to known methods.

Alternatively the metallization of the mixture of monoazo materials (III) and (IV) may be carried out also in aqueous phase with cobalt salts or with hydroxylated organic acid complexes of cobalt, at a temperature of 50–90° C., preferably 70° C., for 1–2 hours. The results, however, are not so appreciable as when applying the anhydrous metallization. (Generally the purity and affinity are slightly poorer.)

The results attainable according to the present invention, namely by metallizing a mixture of the two monoazo materials (III) and (VI), absolutely cannot be attained when each monoazo material is metallized separately and the mechanical mixture of the two so obtained complexes is employed, even when the molar ratios are broadly varied.

The following examples are given by way of illustration rather than limitation.

Example 1

0.025 g. mol of 3,5-bis-N-ethyl-sulfamido-2-aminophenol are indirectly diazotized at 0°–5° C. by pouring the solution of its sodium salt together with 1.73 g. of $NaNO_2$ on diluted hydrochloric acid. The diazo suspension is coupled on 0.03 g. mol of 4-methoxy-1-naphthol in alkaline medium (NaOH) at 0°–2° C.

At the end of the coupling the monoazo (III) is separated out by salting out, or slight acidification, then filtered and dried at 70°–80° C. 0.75 g. mol. of 5-N-methylsulfamido-2-aminophenol are diazotized directly at 0°–5° C. The obtained diazo is coupled on 0.08 g. mol of 4-methoxy-1-naphthol in alkaline medium (NaOH) at 0°–2° C.

At the end of the coupling the monoazo (VI) is separated by slight acidification, then filtered and dried at 70°–80°.

The so obtained monoazo materials (III) and (VI) are mixed and metallized with 0.051 g. mol of cobalt acetate in 100 g. of urea and 50 ml. of dimethylformamide at 120° C. for 2 hours. The mass is discharged in 1500 ml. of water containing 50 ml. of 36° Bé. NaOH.

From the obtained solution the dye is precipitated by salting out at 10% and pH retrogradation through sodium bicarbonate and separated by filtration at 70° C. After drying, a blue-black powder is obtained, which dyes natural and synthetic polyamide fibers in reddish blue with very good characteristics of purity, exhaustion and fastnesses to light and water.

Example 2

The monoazo materials (III) and (VI) obtained as described in Example 1 are suspended in 1000 ml. of water at 70° C., solubilized with 50 ml. of 36° Bé. NaOH and precipitated again by acidification. 0.052 g. mol of cobalt chloride (as solution containing 6% Co) are added, the pH is adjusted to about 9, then the whole is heated at 70° C. Metallization goes rapidly to completion. After about 1 hour, 50 ml. of 36° Bé. NaOH are added to the dye solution.

The obtained solution is filtered, neutralized by adding 50 g. of powdered sodium bicarbonate, then is salted out with sodium chloride up to 10%. The precipitated dye is separated at 70° C. by filtration and dried at 80° C. A black-blue powder is obtained which dyes natural and synthetic polyamide fibers in blue shade less red than the dye obtained in Example 1.

What is claimed is:

1. A cobalt-monoazo mixture complex, the molar ratio of cobalt to said monoazo mixture being 1:2, said monoazo mixture comprising from about 20 to 50 mole percent of the monoazo

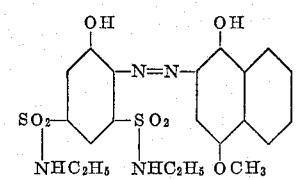

and correspondingly from about 80 to 50 mole percent of the monoazo

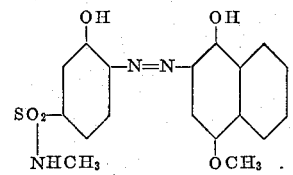

2. The complex of claim 1 wherein said monoazo mixture contains 25 mole percent of the monoazo

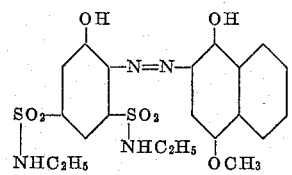

and 75 mole percent of the monoazo

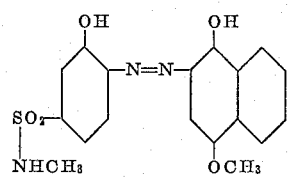

References Cited by the Examiner

UNITED STATES PATENTS

| | | | |
|---|---|---|---|
| 2,671,081 | 3/1954 | Billings | 8—43 |
| 2,806,760 | 9/1957 | Brassel | 8—43 |
| 3,040,019 | 6/1962 | Neier | 260—145 |
| 3,078,267 | 2/1963 | Armento | 8—43 |

FOREIGN PATENTS 594,258  5/1959  Italy.

OTHER REFERENCES

Review of Textile Progress 1961, pages 219–222, pub. 1962 by Butterworth Inc., Washington, D.C.

CHARLES B. PARKER, *Primary Examiner.*

NORMAN G. TORCHIN *Examiner.*

D. LEVY, DONALD M. PAPUGA, *Assistant Examiners.*